Figure 1:
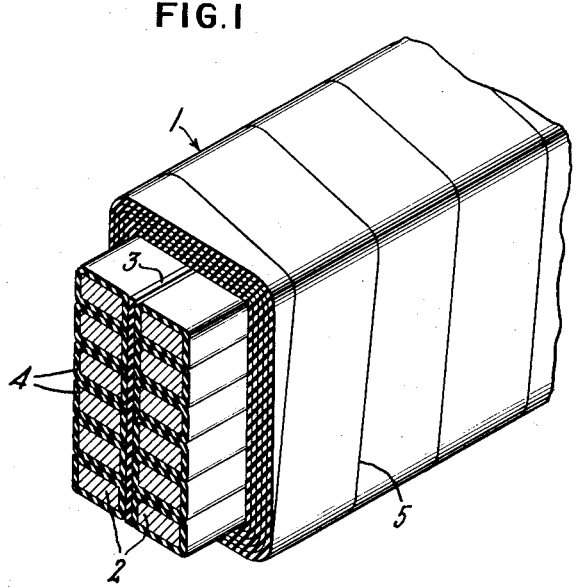

Feb. 7, 1961  C. D. RICHARDSON  2,970,936
INSULATED ELECTRICAL COILS
Filed Dec. 12, 1957

Inventor:
Charles D. Richardson
by  *Kiess*
His Attorney

United States Patent Office 2,970,936
Patented Feb. 7, 1961

2,970,936

INSULATED ELECTRICAL COILS

Charles D. Richardson, Ballston Lake, N.Y., assignor to General Electric Company, a corporation of New York Filed Dec. 12, 1957, Ser. No. 702,286

4 Claims. (Cl. 154—2.23)

This invention relates to the fabrication of electrical widings for electrodynamic machines. More particularly, it relates to the fabrication of insulated electrical conductor bars wherein the bar is compressed to size before curing to permit precise fitting of the slot portion into the slot of the machine stator, at the same time permitting ready and easy connection of the end portions of the windings during assembly of the machine.

Bars for electrodynamic machinery are generally constructed of a plurality of conductor turns insulated from each other by a suitable dielectric material with an outer covering or wrapping of insulation around the entire bar. For larger machines the bars are prefabricated and then placed in mating slots in the machine. The size and shape of the bar must meet close tolerances for reception in the slot and in order that the ends of the bar or half coil can be readily assembled and connected one to the other to form a complete coil and winding assembly.

Normally when the bar insulation is cured before assembly of the bar in the electrodynamic machine frame, the end portions of the bar or half coil, are stiff due to the cured insulation of the winding so that during the assembly and reshaping of the end portions necessary for connecting the bars, the insulation tends to split or crack even when warmed or heated causing immediate or early failure of the winding.

It has been proposed to pressure and heat mold the straight section of the bar in a conventional mold or clamp heated by steam or other means, leaving the end portions uncured and uncompressed until after assembly in the machine, at which time the entire machine is placed in an oven and the end portions cured by heat. It has been found that such a process is lacking in usefulness in that the individual conductor ends are not adequately insulated by the uncompressed impregnated wrapping. It has also been proposed that the slot portions of the bars be cured in a conventional molding press and that the end portions be tightly wrapped in an outer covering such as of polyethylene terepnthalate or similar material which exerts a compressive stress on the insulating wrapping of the winding. However, it has been found that the compressive strength thus afforded is not sufficient to provide an acceptable insulation having a long life under actual operating conditions. A further proposed solution to the problem has been to compress and heat-cure the slot portion of the bar as above and then to apply extra layers of insulation to the end portion to compensate for the fact that the end portions are heat cured only and not heat cured under compression, and hence have less insulating ability per unit thickness. This procedure requires excessive material, makes for a bulky, less compact end structure and thus leads to excessive heat generation in the end windings in a space which is constricted by the presence of the bulky end structure.

A principal object of this invention is to provide a method for fabricating an electrical bar in which the entire bar and its insulation is compressed for the reception of the slot portion of the bar in the slot, the entire bar insulation being cured in place in the machine after assembly of the winding therein.

Briefly the invention comprises the fabrication of electrical conductor bars comprising individual insulated conductor strands covered by insulation impregnated with a thermosetting material in which the entire bar is compressed to its final cross-sectional dimension, placed in the machine, the end portions thereof connected together in the usual manner and the assembled machine or windings heated under gas pressure for final heat curing of the resin. By the invention, the slot portion of the bar, as well as the end portions, are readily assembled and the entire winding receives a uniform similar cure in a minimum number of steps. This is as distinguished from prior art methods in which the bars are either entirely cured before assembly with the above-mentioned breakage of insulation on the end portions or cured in a number of time consuming steps, or in which the end portions of the bar are left uncompressed with resultant lower electrical characteristics. It is also a definite improvement over prior art methods in which the uncompressed end portions are covered with compensating extra thickness of insulation.

The features of the invention which are believed to be novel are set forth with particularity in the claims appended hereto. The invention itself, however, both as to its organization and method of operation together with further objectives and advantages thereof may best be understood from the consideration of the following description and the drawing in which Fig. 1 is a partial perspective view, partially in cross-section of a finished bar made according to the invention and Figure 2 is a perspective view of a stator for an electrodynamic machine showing the present bars in place.

Figure 2:
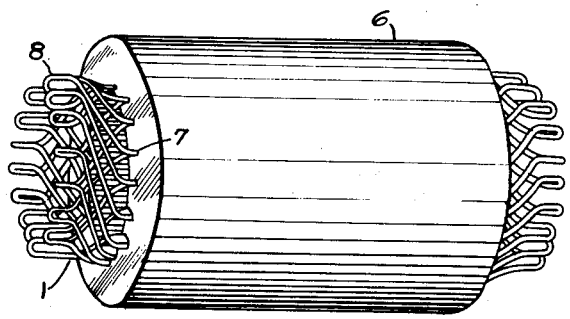

Referring to Figure 1 there is shown a typical cross-section structure of a bar such as that which may be formed according to our invention. The bar 1 comprises a plurality of strands 2 of metal, such as copper, aluminum, and the like arranged in tiers spaced by separator 3 which may typically be of a glass-asbestos resin bonded composition, a cured phenolic resin or other thermosetting material. Each conductor is also typically insulated as with a thermosetting material 4 which may be applied in any usual way as by dipping, spraying, painting, and the like. Thermosetting material 4 can be any number of adhesive resins well known to those skilled in the art including but not limited to epoxy resins, polyesters, phenolics, silicones, etc. or combinations of such material. This turn insulation 4 may also take the form of tape such as of glass fiber or asbestos impregnated with any of these resins, the tape being wound in overlapping fashion over the conductor 2. Wrapped around the conductor assembly are one or more layers 5 of tape comprising a thermosetting material such as those above which is used to impregnate a base fibrous material such as paper, glass fiber, asbestos fabric, and the like. Another base material which is often used is mica paper or mica mat which is made by splitting micaceous material into tiny flakes or platelets which are then laid down in paper-making fashion to form a mica sheet material. The preparation of such mica paper is described, for example, in Patents 2,549,- 880, 2,614,055 and 2,709,158. Still another base material used to wrap such conductor bar arrays is mica flake paper, which is made by laying down thin sheets or flakes of mica on a fibrous or resinous backing material in overlapping fashion.

In carrying out the present invention, the bar is assembled as above in its proper final shape and with all or a part of the outer insulation 5 in place, depending upon the final insulation thickness required, and the entire insulated bar compressed to compact the insulation. In some cases, where the insulation is relatively thick, it is convenient to compact or pressurize the insulation several times after the addition of successive layers of insulation, the final compacted but uncured cross section being such that the slot portion will just mate with the corresponding slot in the machine. The pressurizing or compacting of the insulated bar can be carried out in any manner desired. For example, the straight portion can be pressurized in straight molds and the curved portions in a suitably shaped mold or press, or in a series of properly shaped molds. Alternatively, the entire bar can be molded at one time in a suitably shaped press. From the point of view of uniformity, time saving, economics, and obtaining a uniformly pressurized bar, I prefer to pressurize the entire bar by means of liquid pressure. This can readily be accomplished by placing the bar wrapped in a suitable protective sacrifice tape or envelope in a tank and evacuating to remove volatiles therefrom. This evacuation involves a time-pressure-temperature relationship, and these various parameters may be adjusted as desired so long as the resin content of the insulation is not cured. Typically, a bar is evacuated for about 6 hours at room temperature or higher under a pressure of about 1 mm. of mercury. Other possible variations of time-pressure-temperature will occur to those skilled in the art. After evacuating the volatiles, there is added to the tank holding the bar a pressurizing fluid which is typically a bitumen, such as asphalt, although other oils and liquids may be used which will not seep through the sacrifice tape or deleteriously affect the winding. The pressurizing fluid is heated only to lower its viscosity to the point where it may evenly transmit pressure to the winding immersed therein and not to the point where the resins in the winding insulation are cured. It has been found that a fluid pressure of about 100 lb./sq. in. gage for about 5 to 10 minutes is sufficient to effectively compact the bar insulation to its final cross sectional dimension. The fluid is pressurized by means of air, nitrogen, carbon dioxide, helium, or other non-reactive gas. The above cycle of evacuation and pressurization is repeated as necessary, as layers of insulation are added, to arrive at a thoroughly evacuated and compacted structure. Having compacted the bar and its insulation to the point where it will fit in the mating slots of the machine, it is mounted therein and the ends flexed and moved at will to make necessary connections without cracking the insulation. In some instances heating of the bar ends by electrical resistance to soften the insulation facilitates their bending. With the windings fully assembled and connected, the entire machine or stator is placed in an enclosure such as an oven, where the entire compacted, insulated windings are heat-cured in place. The curing preferably takes place under gas pressure to prevent any tendency of the insulation to puff or expand during the curing cycle. A pressure of about 100 p.s.i.g. has been found to be convenient as well as efficacious although higher pressures can be used. The gas used for pressurizing is any non-reactive gas such as air, nitrogen, carbon dioxide, helium, etc. The curing time for any insulation, of course, depends upon the temperature used. Generally, a curing time of about 16 hours at 120° C. has been found to cure most resins. It will be realized, of course, that the assembled windings can be heated by electrical resistance or other means as long as the prescribed gas pressure is maintained in the insulation. The present method of insulating bars and windings for electrodynamic machines has been found to produce a product which is electrically and physically comparable to windings evacuated and then cured under liquid pressure, such as that of asphalt, and the following example is indicative of such essential quality.

Two bars similar to that shown in the drawing were pressed to a final cross sectional area, the insulation for each bar being similar to that described in Patent 2,707,204 assigned to the same assignee as this invention and applied and evacuated as therein. One of the bars was then cured in asphalt under a pressure of 100 p.s.i.g. and 150° C. for about 16 hours. The other insulated bar was cured in an oven in nitrogen at a pressure of 100 p.s.i.g. and a temperature of 120° C. The cured bars were tested for 60-cycle power factor spread over a voltage range of 5 to 20 kv. at various temperatures as shown in the table below and the 5-kv. power factor was also determined. The results are as shown in the table.

| Temp., ° C. | Bar 1 (Cured in asphalt) | | Bar 2 (Cured in gas) | |
| --- | --- | --- | --- | --- |
| | PF—5 kv. (percent) | ΔPF— 5-20 kv. (percent) | PF—5 kv. (percent) | ΔPF— 5-20 kv. (percent) |
| 18 | 2.17 | .53 | 2.29 | 1.96 |
| 75 | 4.15 | .46 | 4.2 | 3.35 |
| 100 | 7.41 | .96 | 8.68 | 3.12 |
| 125 | 34.0 | 4.6 | 34.3 | 7.2 |
| 18 | 1.41 | 1.21 | 1.74 | 2.55 |

From the above, it will be evident that the bar compressed and then cured in gas is equivalent in an electrical sense to that compressed and then cured in asphalt. The bars before curing were flexible enough with warming to permit the usual electrodynamic machine connections to be made. However, after curing, the insulations cracked when subjected to such bending. The approximately equivalent electrical characteristics for the bars tested further indicate that equivalent bonding takes place with the two methods of curing.

Shown in Figure 2 is a portion of an electrodynamic machine, namely, stator 6 having slots 7 therein for the reception of bars 1 which go to make up the end turns 8 of the winding of the stator.

There is provided by this invention a simple method of preparing bars and windings for electrodynamic machines in which the insulated bars are compacted to proper size, installed in the machine, with electrical connections being made while the bars are still in the flexible, uncured state, and after complete installation heat-curing the windings in place. The process described not only facilitates the assembly of such machines but provides windings the insulation of which is equivalent to those which are both compressed and cured in a heated liquid.

What I claim as new and desire to secure by Letters Patent of the United States is:

1. The method of molding insulated conductor bars for an electrodynamic machine, the insulation containing a thermosetting material which comprises (1) treating said bars in a vacuum to remove volatile material therefrom, (2) subjecting said bars to fluid pressure to compress said bars to their final dimension without curing, (3) assembling said bars in an electrodynamic machine, and (4) heating said electrodynamic machine in a pressurized gas atmosphere to cure said thermosetting material.

2. The method of making insulated conductor bars for an electrodynamic machine, the insulation for said bars containing a thermosetting material, which comprises (1) subjecting said treated bars to a vacuum to remove volatiles therefrom, (2) placing said bars in a pressurized liquid medium to compress said bars to their final dimension without curing, (3) assembling said bars in an electrodynamic machine and heating the ends of said bars to flexibilize them and facilitate their interconnection, and (4) heating said assembled electrodynamic machine under gas pressure to cure said thermosetting material.

3. The method of molding conductor bars for an electrodynamic machine, said bars having insulation impregnated with a thermosetting material which comprises (1) evacuating volatile materials from said insulation, (2) compressing the insulation on said bars in a liquid medium without curing for reception in the slots of said machine, (3) assembling said bars in said machine and (4) heating said bars under gas pressure to cure said thermosetting material.

4. The method of molding conductor bars for an electrodynamic machine stator, said bars having insulation impregnated with a thermosetting material, which comprises (1) evacuating volatile materials from said insulation, (2) compressing the insulation on said bars in a liquid medium without curing for reception in the slots of said stator, (3) assembling said bars in said stator and (4) heating said bars under gas pressure to cure said thermosetting material.

References Cited in the file of this patent

UNITED STATES PATENTS

| | | |
|---|---|---|
| 1,595,838 | Turner | Aug. 10, 1926 |
| 2,456,381 | Clark | Dec. 14, 1948 |
| 2,479,357 | Hill et al. | Aug. 16, 1949 |
| 2,707,204 | Richardson et al. | Apr. 26, 1955 |